(12) United States Patent
Handel

(10) Patent No.: US 6,196,097 B1
(45) Date of Patent: Mar. 6, 2001

(54) BACON SLICER SYSTEM

(75) Inventor: Gary A. Handel, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 09/307,830

(22) Filed: May 7, 1999

(51) Int. Cl.[7] ...................................................... B26D 7/00
(52) U.S. Cl. ................................ 83/77; 83/155.1; 83/157; 83/158; 83/707; 83/932; 198/586; 198/731; 198/861.1
(58) Field of Search ................................... 83/155, 155.1, 83/157, 158, 167, 77, 932, 730, 707, 404.1, 404.2; 198/586, 861.1, 431

(56) References Cited

U.S. PATENT DOCUMENTS

| | | | |
|---|---|---|---|
| 2,839,113 | * 6/1958 | Townsend | ........................ 83/404.1 X |
| 3,550,749 | * 12/1970 | Story | ...................................... 198/431 |
| 5,007,317 | * 4/1991 | Jenkner | ............................ 83/404.2 X |
| 5,269,119 | * 12/1993 | Tolson | ................................... 53/374.5 |

* cited by examiner

Primary Examiner—M. Rachuba
(74) Attorney, Agent, or Firm—Mau & Krull, P.A.

(57) ABSTRACT

A bacon slicing system (10) includes a conveying system (20). The conveying system (20) is mounted for sliding between a first and second lateral position. The conveyor belt (65) of the conveying system (20) is rotatable in a longitudinal direction which is generally perpendicular to the lateral movement of the conveying system (20).

20 Claims, 4 Drawing Sheets

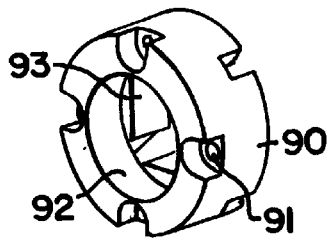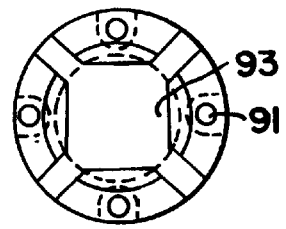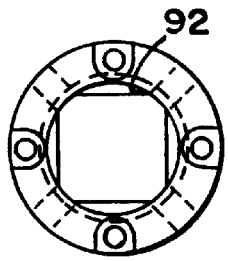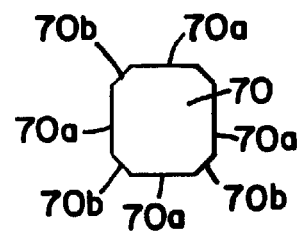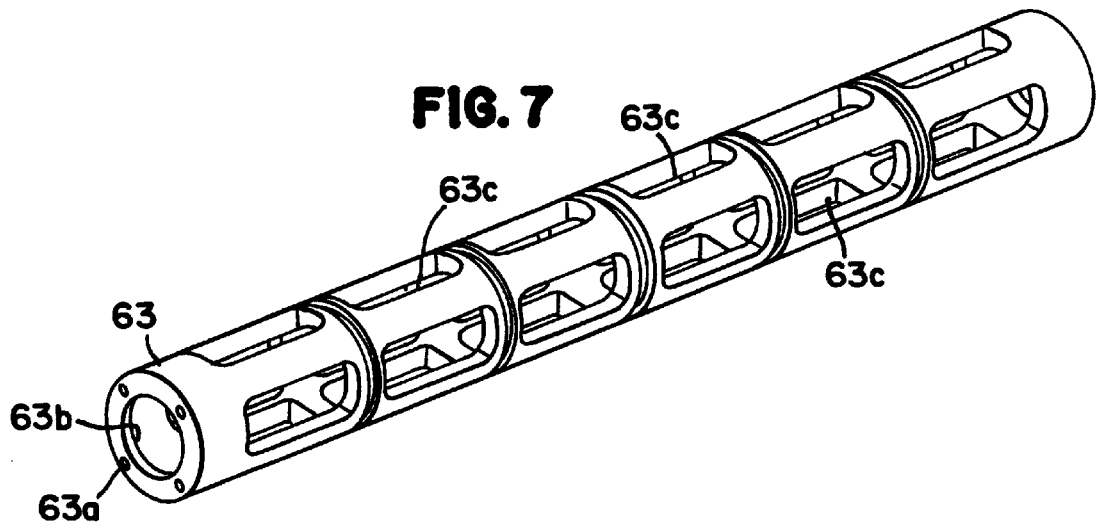

BACON SLICER SYSTEM

BACKGROUND OF THE INVENTION

1. Field of the Invention

This invention relates generally to a bacon slicer system and more particularly to a system which includes a method and apparatus for transferring bacon through a change in direction.

2. Description of the Prior Art

In the past, bacon has normally been packaged in packages which include a plurality of individual bacon slices. These bacon slices are stacked together and form somewhat of a single unit for handling. The stacks, which may be one or two pounds of sliced bacon, have more structural integrity than the individually sliced bacon strips. Therefore, the bacon slices that are stacked together in quantities are more easily transferred as the bacon is being packaged.

Over the past several years, the consumers have desired more convenient packaging. Preparing bacon has always been a relatively messy task and microvable bacon packages have been developed to make cooking bacon less messy. The microwave packages include a plurality of bacon strips that are laterally spaced from each other. The material handling of these bacon strips after they have been sliced has presented difficulties. These difficulties were due in large part to the lack of structural integrity of the individual slices of bacon. It became very difficult to transfer bacon through a 90 degree turn during the manufacturing process. That is, the bacon would come from the bacon slicer in a first direction. It would then be necessary to turn the bacon approximately 90 degrees to go in another direction to be packaged by suitable packaging machines.

Further, the prior art bacon transfer conveyors typically were conveyors made of a plurality of O-rings. This was acceptable when a plurality of bacon slices were being transported together. However, when similar conveyors were used for individual strips of bacon there were often problems, such as bacon slices falling through the conveyor and getting wrapped around the rollers, thereby creating a more difficult clean-up.

When the individual slices of bacon were being transferred through a 90-degree turn, there was often problems in maintaining the sliced bacon spacing and orientation. The slices became disheveled. The spacing of the bacon is important in that two pieces of bacon were normally side by side with a spacing and then two other pieces of bacon side by side. This allowed for four strips of bacon to be packaged flat in a single package. The package is folded over on itself, thereby necessitating the spacing between the two sets of two slices of bacon.

The present invention addresses the problems associated with the prior art bacon slicing systems and provides for a method and apparatus of more effectively transferring bacon slices during a change of direction while still maintaining slice spacing and orientation.

SUMMARY OF THE INVENTION

In one embodiment, the invention is a conveyor having a conveying surface mounted on first and second rollers for rotational movement around the rollers in a longitudinal direction. A rod is mounted on a frame and is mounted generally perpendicular to the longitudinal direction of the conveying surface. A first roller is operatively connected to the rod. A first motor is operatively connected to the rod for rotating the rod and thereby driving the conveying surface in the longitudinal direction. A second motor is operatively connected to the roller for moving the roller laterally on the rod.

In another embodiment, the invention is a sliced bacon system having a bacon slicer for providing a plurality of sliced bacon strips. A conveying surface is mounted on first and second rollers for rotational movement around the rollers in a longitudinal direction. A rod is mounted generally perpendicular to the longitudinal direction of the conveying surface. The first roller is operatively connected to the rod. A first motor is operatively connected to the rod for rotating the rod and thereby driving the conveying surface in a longitudinal direction. A second motor is operatively connected to the roller for moving the roller laterally on the rod, wherein the conveying surface is in a first, lateral position for receiving the bacon strips from the slicer and is then moved to a second lateral position where the rod is rotated to move the bacon strips longitudinally on the conveying surface.

In another embodiment, the invention is a method of transferring bacon through a 90-degree change of direction. The method includes moving a longitudinally rotatable first conveyor to a first lateral position. Bacon strips are then sliced on a conveying surface of the first conveyor. The first conveyor is moved to a second lateral position, the second position spaced from the first position. The first conveyor is rotated to move the sliced bacon strips in a longitudinal direction, generally 90 degrees from the lateral direction.

BRIEF DESCRIPTION OF THE DRAWINGS

FIG. 4 is a perspective view of the end cap used in the conveying system shown in FIG. 3;

FIG. 5 is a right side elevational view of the cap shown in FIG. 4;

FIG. 6 is a left side elevational view of the cap shown in FIG. 4;

FIG. 7 is a perspective view of the roller of the system shown in FIG. 2; and

FIG. 8 is a cross sectional view of the rod shown in FIG. 3.

DETAILED DESCRIPTION OF THE PREFERRED EMBODIMENT

Figure 1:
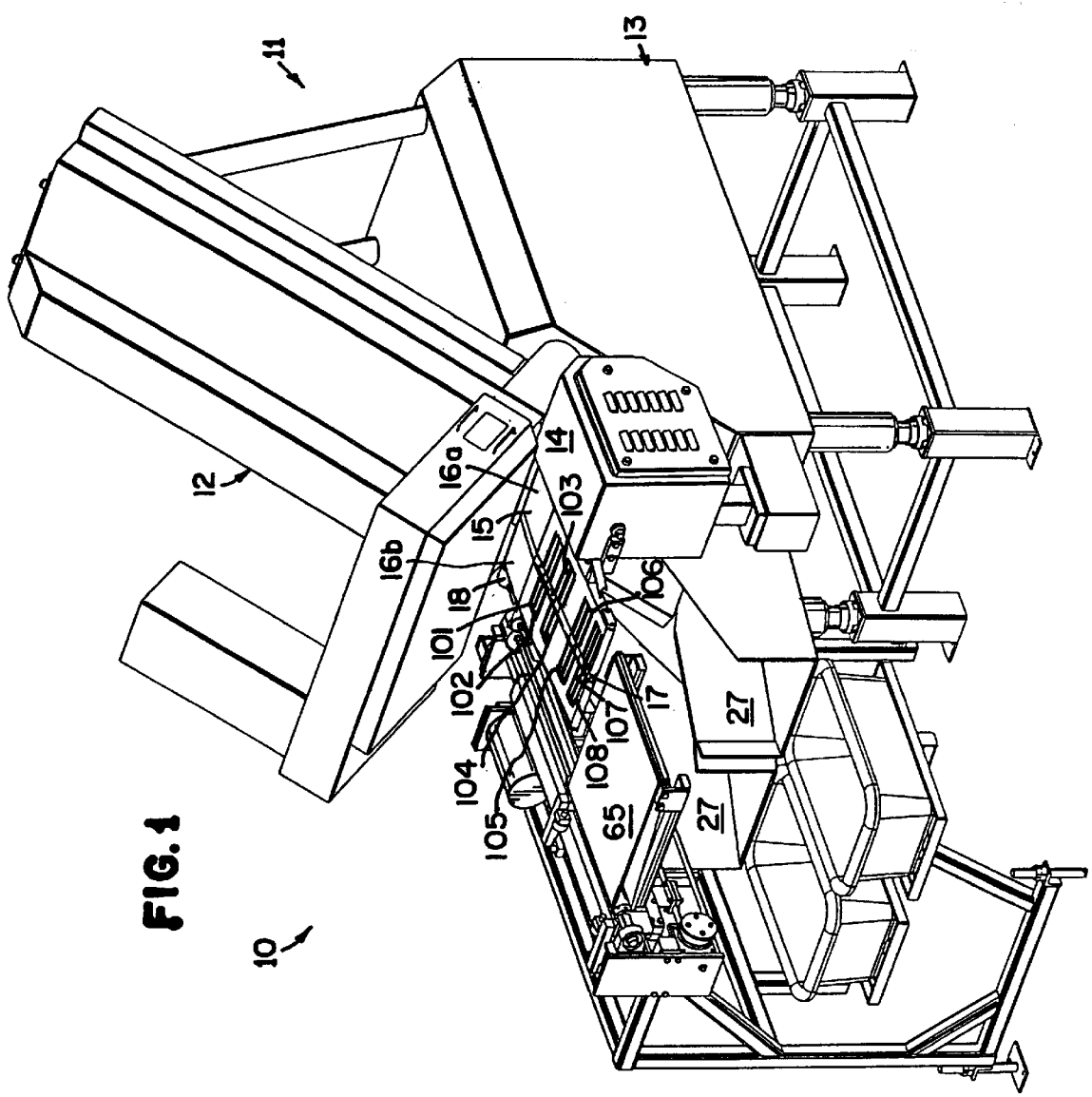
FIG. 1 is a perspective view of the bacon slicing system constructed in accordance with the principals of the present invention.

Referring to the drawing, wherein like numerals represent like parts throughout the several views, there is generally designated at 10 a bacon slicing system. The bacon slicing system 10 includes a bacon slicer 11. Any suitable bacon slicer may be utilized such as a Webber SLC501 bacon slicer. The bacon slicer 11 includes a belly stacking apparatus 12, a support frame structure 13, control panel 14 and a slicing blade (not shown) positioned at the end of the belly infeed table.

A split conveyor 15 receives the individually sliced strips of bacon 101 through 108. The split conveyor 15 is synchronized with the slicing blade so that the bacon strips are dispensed in a suitable pattern. For packing four strips of microwavable bacon in each package, a suitable spacing is shown in FIG. 1. That is, strips 101 and 102 are separately sliced and positioned adjacent to each other. There is a small space approximately ⅜ inch to ½ inch between bacon strips 102 and 103. Strip 104 is adjacent to strip 103. There is a larger space, approximately 1 ½ inches between strips 104 and 105. Strip 106 is adjacent strip 105 and there is another small space ⅜ inch to ½ inch between strips 106 and 107. Finally, strip 108 is sliced adjacent the strip 107. The conveyor 15 has a split belt and includes a first portion 16a and second portion 16b. The belt portions 16a and 16b both rotate around a front roller 17 and a rear roller 18. As is well known in the art, a suitable drive motor synchronizes the movement of the conveyor with the slicing of the bacon strips to configure the bacon on the conveyor.

Figure 2:
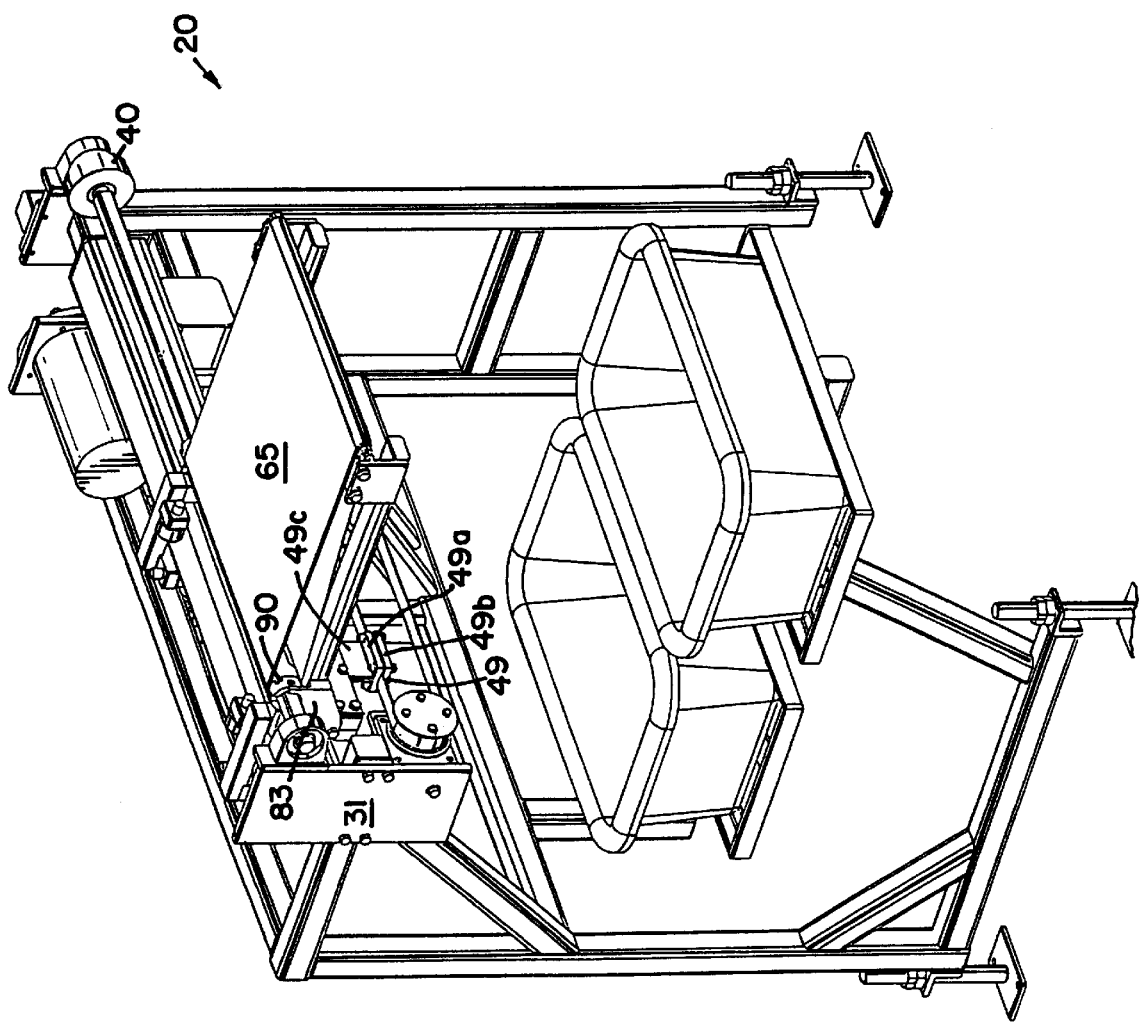
FIG. 2 is a perspective view of the bacon slicing system shown in FIG. 1 with the bacon slicer removed.
Figure 3:
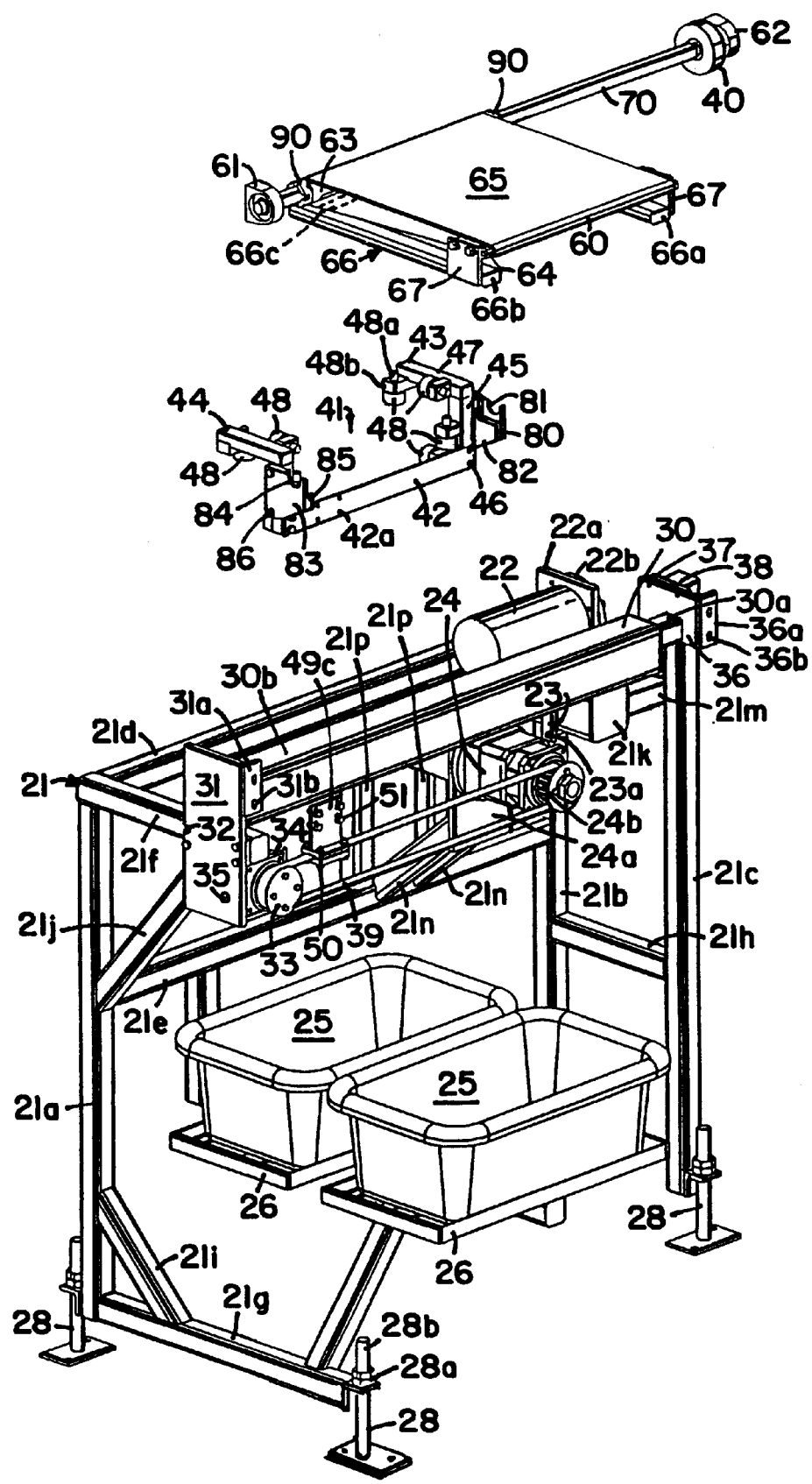
FIG. 3 is an exploded perspective view of the two-way conveyor shown in FIG. 1.

Referring now to FIGS. 2 and 3, there is shown the conveying system 20 which is referred to as a two-way conveyor. The conveying system 20 includes a frame 21. The frame 21 is a welded frame and includes three upright members 21a, 21b and 21c. Upright members 21a and 21b are connected by cross members 21d and 21e. Side member 21f extends from the junction of members 21a and 21d. Side member 21g extends from the bottom of the upright member 21a and side member 21h extends between the upright members 21b and 21c. Braces 21i and 21j further provide for a sturdy frame 21. Another cross member 21k is welded at one end to the cross member 21d. Another member 21m is welded at one end to the upright member 21c and to the cross member 21k. The cross member 21k provides for a support for a servo motor 22. The nut bar 23 is a bar with two tapped holes and is on either side of cross member 21k and extends down below and above the cross bar 21k. An opening 23a is formed at the bottom of the nut bar 23. The motor 22 may be any suitable motor and is preferably a servo motor. The servo motor 22 has a facing plate 22a. The facing plate 22a extends down below the motor 22 and is adjacent the cross member 21k. The facing plate 22a extends below the cross member 21k and a bolt (not shown) extends through the nut bar opening 23a and is secured to the facing plate 22a, thereby securing the motor 22 in position.

Another motor, again preferably a servo motor 24, is secured between two uprights 21p which are welded between member 21d and 21e. Two angled braces 21n are welded at one end to the cross member 21e and at the other end are suitably connected to a mounting plate 24a of the servo motor 24. The servo motor 24 is thereby securely suspended from the frame 21.

Two scrap bins 25 are positioned on platforms 26 which are in turn secured to the uprights 21b and 21c. The scrap bins 25 are for receiving scrap bacon slices from the conveyor 15. It is possible for the bacon slices on the conveyor 15 to be rejected and they may be simply indexed off the end of the conveyor 15 into the chutes 27 located beneath the conveyor 15. This typically occurs when the first slices are cut from the belly. Three adjustable feet 28 are shown in the drawings are operatively connected to the frame 21. A forth foot is not shown and is attached at the bottom of upright 21b. The feet 28 are adjustable by means of moving the nuts 28a on the threaded rod 28b, as is well known in the art.

A beam 30 is mounted between the upright 21c and the side member 21f. The left end 30a is welded to the top of the cross member 21f. The right end 30a is welded to the upright 21c. The beam 30 is sized downward from the "4×4" dimension throughout the rest of its length to a "2×2" dimension proximate the member 21c. This is to allow room for a drive belt, as will be described hereafter. A first mounting plate 31 is bolted to the side member 21f by bolts 32. An idler pulley 33 is mounted to a bracket 34 which is in turn mounted to the plate 31 by bolt 35. The plate 31 has a flange 31a having two openings 31b formed therein. A second mounting plate 36 is mounted to the upright 21c by two bolts 37 which secure the plate to an intermediate plate 38 which is in turn welded to the upright 21c. The mounting plate 36 has a flange 36a which has two openings 36b formed therein.

The motor 24 has a drive pulley 24b with a plurality of teeth. A timing belt 39 is positioned around the drive pulley 24b and the idler 33. The motor 22 has a drive pulley 22b which is attached by a timing belt (not shown) which connects to an idler pulley 40 as will be described more fully hereafter. The beam 30 is reduced in size at its right end 30b to allow for the timing belt to go from the drive pulley 22b to the idler 40.

A shuttle cradle generally designated at 41 is best seen in FIGS. 2 and 3. The cradle 41 is used to shuttle the conveyor 60 along a rod 70. The cradle 41 has a spacer bar 42 on which a right cradle structure 43 and a left cradle structure 44 is mounted. The right and left cradle structures are mirror images of each other and only one will be described in detail. A first upright member 45 is bolted to the spacer bar 42 by bolts 46. A horizontal member 47 is welded to the top of the upright member 45. Four cam followers 48 are rotatably mounted on their spindles 48a in a mounting block 48b. It can therefore be seen that there is one cam follower 48 for each of the four surfaces of the beam 30. The cam followers 48 hold the shuttle cradle 41 firmly in place on the beam 30 and allow for the shuttle to slide along the length of the beam 30. Four similar cam followers 48 are secured to the left cradle structure 44, two of which are not shown. In assembling the shuttle cradle 41 to the beam 40, one of the cam followers 48 is taken out of the mounting block 48b and the shuttle cradle 41 placed in position. Then the cam follower 48, which was removed, is inserted and secured in the mounting block 48b, thereby securing the shuttle cradle 41 on the beam 30. Four mounting holes 42a are formed in the spacer bar 42. The right cradle structure 43 has a yoke 80 secured thereto. The yoke 80 has a semi circular opening 81 and a base member 82. The left cradle structure 44 has a similar yoke 83. The yokes 80 and 83 are mirror images of each other. As best seen in viewing the yoke 83, the yoke 83 is secured to the left cradle structure 44 by bolts 86. The yoke 83 has a semi-circular opening 84 and a base member 85.

A clamp 49 is secured to the timing belt 39 by capturing the timing belt 39 between a top member 49a and a bottom member 49b. Four bolts 50 are utilized to clamp the members. A vertical member 49c is operatively connected to the top member 49b. The vertical member 49c is secured to the spacer bar 42 by four bolts 51 which mounted into the openings 42a. A first bearing block 61 is mounted to the flange 31a by suitable means such as bolts through the openings 31b. A second bearing block 62 is mounted to the flange 36a by suitable means such as bolts through the openings 36b. A square rod 70 has two circular ends for mounting in the bearing blocks 61 and 62. The idler pulley 40 is secured to the circular end of the rod 70 proximate the bearing block 62. Any rotation of the idler pulley 40 by the timing belt connected to the servo motor 22 causes a rotation of the rod 70.

The conveyor 60 has a rear roller 63 and a forward roller 64. The roller 63 is best seen in FIG. 7. The roller 63 has four openings 63a into which screws may be inserted to secure and end cap 90, which will be described more fully hereafter. A bore 63b extends through the length of the rollers 63. The bore is generally round throughout the length of the roller 63. The ends of the bore 63b are circular for mating with the end cap 90. A plurality of openings 63c are formed in the roller 63. As shown in FIG. 7, there are 24 openings 63c. The openings 63 allow for easy cleaning. Pressurized air and/or water may be directed into the openings 63c to clean the roller 63 as well as the rod 70. The conveyor 60 has a conveying surface 65 which is an endless belt which rotates around the rollers 63 and 64. The forward roller 64 is supported by a frame structure 66 which includes a right member 66a, a left member 66b and a back member 66c which is welded between the right member 66a and the left member 66b. The rear section of the left member 66b is welded to the base member 85 and the right member 66a is welded to the base member 82. Mounting plates 67 are welded to the members 66a and 66b. Suitable bearings are carried by the plates 67 and the roller 64 is mounted in the bearings.

The rear roller 63 has a round bore which is sized and configured to receive the rod 70. The square configuration of the rod 70 and the square bore of the rear roller 63 allows for the roller 63 to slide laterally on the rod 70 and still provides for the transmission of torque to the roller 63 when the rod 70 is turned. It is of course understood that other non-circular configurations such as triangles, pentagons, etc., may also be used to provide a sliding surface as well as transmitting torque. The end caps 90 are provided on both the right and left of the rear roller 63.

While the rod 70 has been described heretofore as square, the edges of the rod preferably have a radius. This is best seen in FIG. 8. The rod has four sides 70a, which would form a square if connected. However, where the four sides are connected, there are actually four radiuses 70b. The four radiuses 70b are arcs which are a part of a circle. The circle and square formed thereby are sized and configured to fit within the end cap, as best seen in FIGS. 4–6. The end cap 90 has a generally circular outer shape. Four holes 91 are formed therein and are used to secure the end cap 90 to the rod 70 by suitable means such as set screws (not shown). A circular bore 92 is formed in the outer section of the cap 90 and has a diameter of approximately 1.255 inches. With tolerances, this is sized and configured to fit a circular shaft having a diameter of 1.25 inches. This diameter of 1.255 inches is the diameter formed by the circle defined by the four radiuses 70b. The inner section of the cap 90 has a square bore 93 and has a distance between the four side surfaces of approximately 1.010 inches. This allows for the acceptance of a rod 70 having a dimension of approximately 1.00 inches which is the distance between the faces 70a. The square bore 93, matching up with the square rod, allows for the transmission of torque as the rod 70 rotates. However, each time the rod would rotate, there would be some chattering of the rod and roller as the tolerances had to be sufficient to allow the roller 63 to slide on the rod 70. However, the circular bore 92 matching with the circular radiuses of the rod 70 hold the rod 70 concentric within the end caps 90 and eliminate chatter as the rod 70 rotates.

In operation, the belly is loaded onto the belly stacking apparatus 12 and a plurality of bacon strips are cut. Typically, the first slices are not uniform and the conveyor belt 15 runs in reverse to dump the slices off the rear into the chute 27. Bacon is then sliced and placed on the conveyor 15 with appropriate spacing as previously described. It is understood that other spacing may be utilized depending upon the type of packaging ultimately used for the bacon strips. Once the eight strips of bacon 101 through 108 are in position, the conveyor 15 continues to move. The conveying system 20 is not in a first lateral position as shown in FIG. 1, but underneath the conveyor 15, or in a second lateral position. The servo motor 24 then rotates to move the timing belt 39 to the left, as shown in FIG. 3. This in turn carries the clamp 49 and shuttle cradle 41 to the left toward a first lateral position as the conveyor belt 65 moves from underneath the conveyor 15. The yoke 81 contacts the right end cap 90 as the conveyor moves from the second lateral position to the first lateral position. The bacon is transferred from the conveyor belt 15 to conveyor belt 65 as this motion occurs. When moving from the first lateral position to the second lateral position, back under the conveyor 15, the yoke 84 contacts left end cap 90 and moves the roller 63 to the right. The conveying system 20 is moved to the second lateral position such that the left section of the conveyor belt 65 is positioned under the edge of the conveyor 15. The conveyor 15 is moving so that the bacon slices 101 through 108 are transferred off of the end of the conveyor 15 onto the belt 65. As the conveyor 15 is moving, the conveying system 20 is moving back towards the first lateral position so that the bacon is spaced at the appropriate intervals. If more distance or spacing is needed between the bacon slices, the speed of the motor 24 is increased to move conveyor 65 to a speed faster than that of the conveyor belt 15.

Then, once the conveying system 20 is fully out from under the conveyor 15, the servo motor 22 is activated rotating the timing belt which is connected to the idler pulley 40. The rotation of the idler pulley 40 causes rotation of the square shaft 70 mounted inside of the square bore 93 of the end cap 90. This provides for the torque necessary to begin rotation of the belt 65 around rollers 63 and 64. Another conveyor belt (not shown) is abutted the end of the conveyor belt 65 proximate the forward roller 64. This allows for the transfer of the bacon slices 101 through 108 onto the next conveyor system where it may be further transferred and utilized in the packaging operation. The conveyor on which the bacon slices are transferred is typically at the same height as the belt 65. The bacon slices, at this stage, are being transferred longitudinally and can more easily be transferred from one conveyor to another. When the bacon slices are transferred from the conveyor 15 to the conveyor system 20, this is a transverse transfer and is more difficult. The use of the conveying system 20 located under the conveyor 15 allows for the transfer of the bacon slices without disturbing their orientation and without the bacon slices becoming disheveled.

It is understood that the present invention may also encompass an embodiment wherein it would not be necessary to utilize the conveyor 15 of the bacon slicer 10. It is envisioned that the conveyor 60 could be indexed further toward the slicing blade of the bacon slicer. The bacon slicer could be constructed such that the sliced bacon strips would fall directly on to the belt 65. The correct spacing of the bacon strips would be accomplished by coordinating the movement of the servo motor 24 with that of the bacon slicer 10.

The above specification, examples and data provide a complete description of the manufacture and use of the composition of the invention. Since many embodiments of the invention can be made without departing from the spirit and scope of the invention, the invention resides in the claims hereinafter appended.

I claim:
1. A conveyor comprising:
 (a) a conveying surface mounted on first and second rollers for rotational movement around the rollers in a longitudinal direction;
 (b) a rod mounted on a frame and mounted generally perpendicular to the longitudinal direction of the conveying surface;
 (c) a frame structure, the frame structure having a first end and a second end, the first end operatively connected to the rod and the second end extending from the rod;

(d) the first roller operatively connected to the rod and the first end of the frame structure and the second roller operatively connected to the second end of the frame structure;

(e) a first motor operatively connected to the rod for rotating the rod and thereby driving the conveying surface in the longitudinal direction; and (f) a second motor operatively connected to the first roller and the second roller for moving the rollers laterally on the rod.

2. The conveyor of claim 1, wherein the conveying surface is a continuous surface.

3. The conveyor of claim 1, further comprising the first roller having first and second end caps having a generally non-circular bore formed therein and the rod having a generally matching non-circular cross-section, wherein the roller is slidable on the rod and rotation of the rod transmits torque to the roller.

4. The conveyor of claim 3, wherein the bore is generally square.

5. The conveyor of claim 4, wherein the motors are servo motors.

6. The conveyor of claim 1, further comprising a shuttle cradle for laterally moving the rod, the shuttle cradle comprising:

(a) first and second cradle structures having a spacer bar operatively connecting the structures;

(b) each structure having a plurality of cam followers attached thereto; and (c) each structure having a yoke to engage the first roller.

7. The conveyor of claim 6, further comprising the first and second end caps operatively connected to the rod and the end caps positioned proximate the first and second yokes, wherein movement of the shuttle cradle causes one of the yokes to contact one of the end caps to laterally move the first roller.

8. The conveyor of claim 7, wherein the end caps each have a central bore formed therein through which the rod is secured, the bore having a first generally non-circular portion and a second generally circular portion, wherein the non-circular portion transmits torque to the rod and the circular portion holds the rod concentric.

9. A sliced bacon system, comprising:

(a) a bacon slicer for providing individually sliced bacon strips;

(b) a first conveying surface mounted on first and second rollers for rotational movement around the rollers in a longitudinal direction;

(c) a rod mounted generally perpendicular to the longitudinal direction of the conveying surface:

(d) a frame structure, the frame structure having a first end and a second end, the first end operatively connected to the rod and the second end extending from the rod;

(e) the first roller operatively connected to the rod and the first end of the frame structure and the second roller operatively connected to the second end of the frame structure;

(f) a first motor operatively connected to the rod for rotating the rod and thereby driving the conveying surface in the longitudinal direction; and (g) a second motor operatively connected to the first roller and the second roller for moving the rollers laterally on the rod, wherein the conveying surface is in a first, lateral position for receiving the bacon strips from the slicer and is then moved to a second lateral position where the rod is rotated to move the bacon strips longitudinally on the conveying surface.

10. The sliced bacon system of claim 9, further comprising a second conveyor positioned under the bacon slicer for receiving the sliced bacon strips, the second conveyor rotating generally perpendicular to the rotation of the first conveying surface.

11. The sliced bacon system of claim 10, wherein the conveying surface is a continuous surface.

12. The sliced bacon system of claim 10, further comprising the first roller having first and second end caps having a generally non-circular bore formed therein and the rod having a generally matching non-circular cross-section, wherein the roller is slidable on the rod and rotating of the rod transmits torque to the roller.

13. The sliced bacon system of claim 12, wherein the bore is generally square.

14. The sliced bacon system of claim 13, wherein the motors are servo motors.

15. The sliced bacon system of claim 10, further comprising a shuttle cradle for laterally moving the rod, the shuttle cradle comprising:

(a) first and second cradle structures having a spacer bar operatively connecting the structures;

(b) each structure having a plurality of cam followers attached thereto; and (c) each structure having a yoke to engage the first roller.

16. The sliced bacon system of claim 15, further comprising the first and second end caps operatively connected to the rod and the end caps positioned proximate the first and second yokes, wherein movement of the shuttle cradle causes one of the yokes to contact one of the end caps to laterally move the first roller.

17. The sliced bacon system of claim 16, wherein the end caps each have a central bore formed therein through which the rod is secured, the bore having a first generally non-circular portion and a second generally circular portion, wherein the non-circular portion transmits torque to the rod and the circular portion holds the rod concentric.

18. A conveyor comprising:

(a) a conveying surface mounted on a first roller and a second roller for rotational movement around the rollers in a longitudinal direction:

(b) a rod mounted on a frame and mounted generally perpendicular to the longitudinal direction of the conveying surface:

(c) a frame structure, the frame structure having a first end and a second end, the first end operatively connected to the rod and the second end extending generally perpendicular from the rod;

(d) the first roller operatively connected to the rod and the first end of the frame structure and the second roller operatively connected to the second end of the frame structure; and (e) a drive unit operatively connected to the rod and the rollers for rotating the rod thereby driving the conveying surface in the longitudinal direction and for moving the rollers laterally on the rod.

19. The conveyor of claim 18, wherein the drive unit includes a first motor and a second motor, the first motor operatively connected to the rod for rotating the rod and thereby driving the conveying surface in the longitudinal direction, and the second motor operatively connected to the rollers for moving the rollers laterally on the rod.

20. The conveyor of claim 19, wherein the motors are servo motors.

* * * * *